United States Patent [19]

Albaric

[11] 4,114,058

[45] Sep. 12, 1978

[54] SEAL ARRANGEMENT FOR A DISCHARGE CHAMBER FOR WATER COOLED TURBINE GENERATOR ROTOR

[75] Inventor: Jacques E. Albaric, Monroeville, Pa.

[73] Assignee: Westinghouse Electric Corp., Pittsburgh, Pa.

[21] Appl. No.: 720,331

[22] Filed: Sep. 3, 1976

[51] Int. Cl.² .............................................. H02K 9/00
[52] U.S. Cl. .......................................... 310/54; 310/61; 277/3; 277/59
[58] Field of Search ................ 310/54, 57, 52, 58, 310/53, 59, 60, 64, 85, 65; 277/3, 59, 28; 290/52

[56] References Cited

U.S. PATENT DOCUMENTS

| | | | |
|---|---|---|---|
| 3,540,741 | 11/1970 | Le Febvre | 277/28 |
| 3,733,501 | 5/1973 | Heller | 310/54 |
| 3,740,596 | 6/1973 | Curtis | 310/54 |
| 3,831,046 | 8/1974 | Curtis | 310/54 |
| 4,010,960 | 3/1977 | Martin | 277/3 |
| 4,014,555 | 3/1977 | Jacottet | 277/3 |

*Primary Examiner*—R. Skudy
*Attorney, Agent, or Firm*—G. H. Telfer

[57] ABSTRACT

A discharge chamber seal arrangement for a water cooled turbine generator rotor. The discharge chamber seal arrangement comprises a gland seal operable during high speed operation of the rotor and a contact seal operable during low rotor speed and at standstill. A suitable control arrangement activates and deactivates the contact seal when the rotor is operating in a predetermined operational speed range.

8 Claims, 5 Drawing Figures

SEAL ARRANGEMENT FOR A DISCHARGE CHAMBER FOR WATER COOLED TURBINE GENERATOR ROTOR

BACKGROUND OF THE INVENTION

1. Field of the Invention

This invention relates to dynamoelectric apparatus having a water cooled rotor therein, and in particular, to a seal arrangement for a discharge chamber of such a rotor.

2. Description of the Prior Art

Large turbine generators are usually of the inner cooled or direct cooled construction in which a coolant fluid is circulated through duct means in the stator and rotor slots in direct thermal contact with the current carrying conductors disposed within the ground insulation. This type of construction provides an effective cooling system and has made it possible to greatly increase the maximum rating obtainable in large generators without exceeding the permissible limits of physical size. The coolant used in these machines has usually been hydrogen, which fills the gas-tight housing and is circulated by a blower on the rotor shaft through the ducts of the stator and rotor windings and through ducts in the stator core.

The maximum ratings required in large generators have continued to increase, making it necessary to further improve the cooling of these machines in the larger sizes. A substantial improvement in cooling can be obtained by the use of a more efficient cooling fluid, such as liquid. This has been done in stators by circulating a liquid coolant, such as water, through the ducts of the stator winding. A substantial further improvement can be obtained by applying liquid coolant to the rotor by circulation of a suitable liquid, such as water, through the passages in the rotor windings.

Many problems are involved, however, in circulating a liquid coolant through the passages of the rotor of a large generator rotating at a high speed, usually 3600 revolutions per minute. One of the most difficult problems is that of introducing the liquid into the rotor and discharging it therefrom. The liquid is preferably introduced along the axis of the shaft where the centrifugal force on the liquid is at a minimum, and is discharged through radial passages in the rotor shaft. A relatively large volume of liquid must be introduced into the rotor under sufficient pressure to maintain the desired flow rate to the rotor, and the same liquid is discharged from the rotor at high velocity and under high pressure into a stationary cooling discharge chamber from which it is drained. It is apparent that in a liquid cooled rotor, suitable seals must be provided at the discharge passages. However, the provision of such seals for the discharge chamber poses a difficult problem because of the high velocity of the liquid and the pressures involved.

Conventional seals for rotating shafts have serious disadvantages when applied to a discharge passage of a large dynamoelectric machine shaft rotating at high speeds. Labyrinth seals are well known in the art, but such seals are not effective for coolant liquid such as water, because of the large clearances required between the seal housing and the rotating shaft. Also, labyrinth seals are ineffective for liquids having a low viscosity, such as water, which results in excessive leakage through the seal.

Friction or face type seals are also well known in the art. These seals, however, are impractical for sealing the discharge chambers of a liquid cooled rotor at the high rubbing velocities involved, which may be in excess of 20,000 feet per minute. Such rubbing velocities result in very rapid wear with excessive heating and friction loss, and are thus inappropriate for use to seal the discharge chambers of the liquid cooled rotors during high speed operation.

Fluid film gland seals using stationary seal rings are more suitable for the discharge chamber of the rotor for the difficult conditions involved during high speed operation. The known single flow type of circumferential ring seal, however, would have excessive leakage of liquid through the clearance space between the seal ring and the shaft because of the high pressure drop across the seal ring. Since the coolant liquid must be decontaminated and must be treated to keep the oxygen content at a level that does not cause corrosion in the interior of the rotor windings, the leakage and subsequent loss of large amounts of coolant water is undesirable. The loss of this treated water would require a large amount of treated makeup water requiring a larger water circulation system and an increased amount of expensive treatment equipment which would increase the manufacturing and operation costs. Leakage of the treated coolant must therefore be minimized.

The prior art provides a fluid film gland seal that utilizes a stationary seal ring encircling the shaft adjacent the coolant discharge chamber with a small clearance. In order to minimize leakage of the coolant liquid out of the discharge chamber through this clearance, a sealing liquid is introduced into the clearance between the ring and the shaft. The sealing liquid is maintained at a pressure not exceeding the pressure of the coolant liquid in the discharge chamber. A small amount of the coolant liquid may therefore escape through the clearance around the shaft, but the amount of coolant liquid escaping is minimized and contamination of the coolant liquid by the sealing liquid is prevented. Several chambers having predetermined pressures therein are provided adjacent to the seal ring to prevent the liquid from escaping from the atmospheric chamber. In this way a very efficient seal is provided for a large volume of liquid with a high velocity and pressure. U.S. Pat. No. 3,733,501, issued to P. R. Heller et al, and assigned to the assignee of the present invention, discloses an example of the prior art using a gland seal of this type.

An even more efficient gland seal for sealing the discharge chamber of a water cooled rotor is that disclosed and claimed in U.S. Pat. No. 3,831,046, issued to L. P. Curtis et al, and assigned to the assignee of the present invention. This seal disposes a gaseous fluid within the discharge chamber in order to minimize fluid friction losses between the rotor surface and the discharged coolant liquid in the seal chamber. In order to prevent contamination of the coolant liquid, a stationary seal ring is provided in an annular chamber adjacent the discharge chamber. The seal ring encircles the shaft with a small predetermined clearance. In order to minimize leakage of the coolant liquid through the clearance space between the seal ring and the rotor shaft, a first sealing liquid is introduced through an opening in the seal ring into the clearance space between the ring and the shaft. This first sealing liquid is maintained at a predetermined pressure and is specially treated before use in the apparatus. A second sealing liquid is introduced through a separate opening in the seal ring into the clearance between the seal ring and the shaft. The second sealing fluid is maintained at a pressure not exceeding the pressure of the first sealing liquid. The first sealing liquid is disposed so as to be interposed between the partially filled coolant discharge chamber and the second sealing liquid. Small amounts of the first sealing liquid may escape through the clearance space around the shaft into the coolant discharge chamber, but intermingling of the cooling liquid with the first sealing liquid would not be disadvantageous, since the first sealing liquid is treated in a manner similar to the coolant liquid.

However, since the first sealing liquid is at a slightly higher pressure than the second sealing liquid, disposing the first sealing liquid between the coolant liquid and the second sealing liquid prevents the intermingling and the contamination of the coolant liquid by the second sealing liquid. Several chambers having predetermined pressures therein are provided to prevent the escape of liquid along the shaft. In this way, a very effective seal is provided for handling large volumes of liquid coolant at high pressures and velocities. The seal increases the efficiency of the apparatus and prevents cavitation at the surface of the rotor.

Although the fluid-film gland seals described above are efficient at the high operating velocities of the rotor, such seals are not as efficient at low rotating speeds or at standstill. Since for practical purposes the rotor must be kept filled with water at all times, the discharge chamber is required to be isolated from the atmosphere at all times, and sealing liquid flow in these prior art seals must be maintained at all times. Consequently, at low speeds or at standstill where friction losses are small, large amounts of the specially treated sealing liquid may leak away from the sealing arrangement. This leakage is significant because it is the amount of the maximum sealing liquid flow, which is the flow at standstill, which determines the size and volume requirements for the sealing liquid supply system. As stated earlier, contact seals are inefficient for use at high operational velocities due to excessive friction and rubbing wear which occur at these velocities. However, at low rotational velocities or at standstill, a contact seal is highly efficient.

Therefore, to minimize the maximum sealing fluid leakage flow through a large diameter fluid-film gland seal and to minimize the size of the supply system of that seal, the sealing at standstill and at low speeds should be improved. Since contact seals are most efficient at standstill and at low rotational speeds, and since fluid-film gland seals are most efficient at high operating rotational speeds, a sealing arrangement utilizing the features of each seal seem appropriate in a seal arrangement for a discharge chamber of a large turbine generator water cooled rotor.

SUMMARY OF THE INVENTION

This invention discloses a sealing arrangement for a discharge chamber of a large water cooled turbine generator rotor. A fluid-film gland seal is provided to efficiently seal the discharge chamber during high rotational operation of the rotor, while a contact seal is provided to efficiently seal the discharge chamber at low rotating speeds and at standstill. Suitable control means for activating and deactivating the contact seal when the rotor speed reaches predetermined threshold values is provided. The contact seal is a segmented seal ring which is applied in response to the control means to insure sealing of the discharge chamber when the rotor speed reaches the predetermined threshold value.

An object of this invention is to provide a seal arrangement for the discharge chamber of a water cooled turbine generator rotor which provides efficient sealing throughout the entire range of operating speeds of the rotor. It is a further object to provide a seal arrangement for the discharge chamber that is capable of efficient sealing at high and low rotor speeds and at rotor standstill. A further object of this invention is to provide in combination with a high speed seal a contact seal activated by suitable control means to efficiently seal a discharge chamber of a large water cooled turbine generator rotor during operation of the rotor at low speeds and at standstill. It is a still further object of this invention to minimize the cost of water treatment for a liquid cooled rotor by limiting the amount of specially treated coolant fluid which may escape from the seal arrangement.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
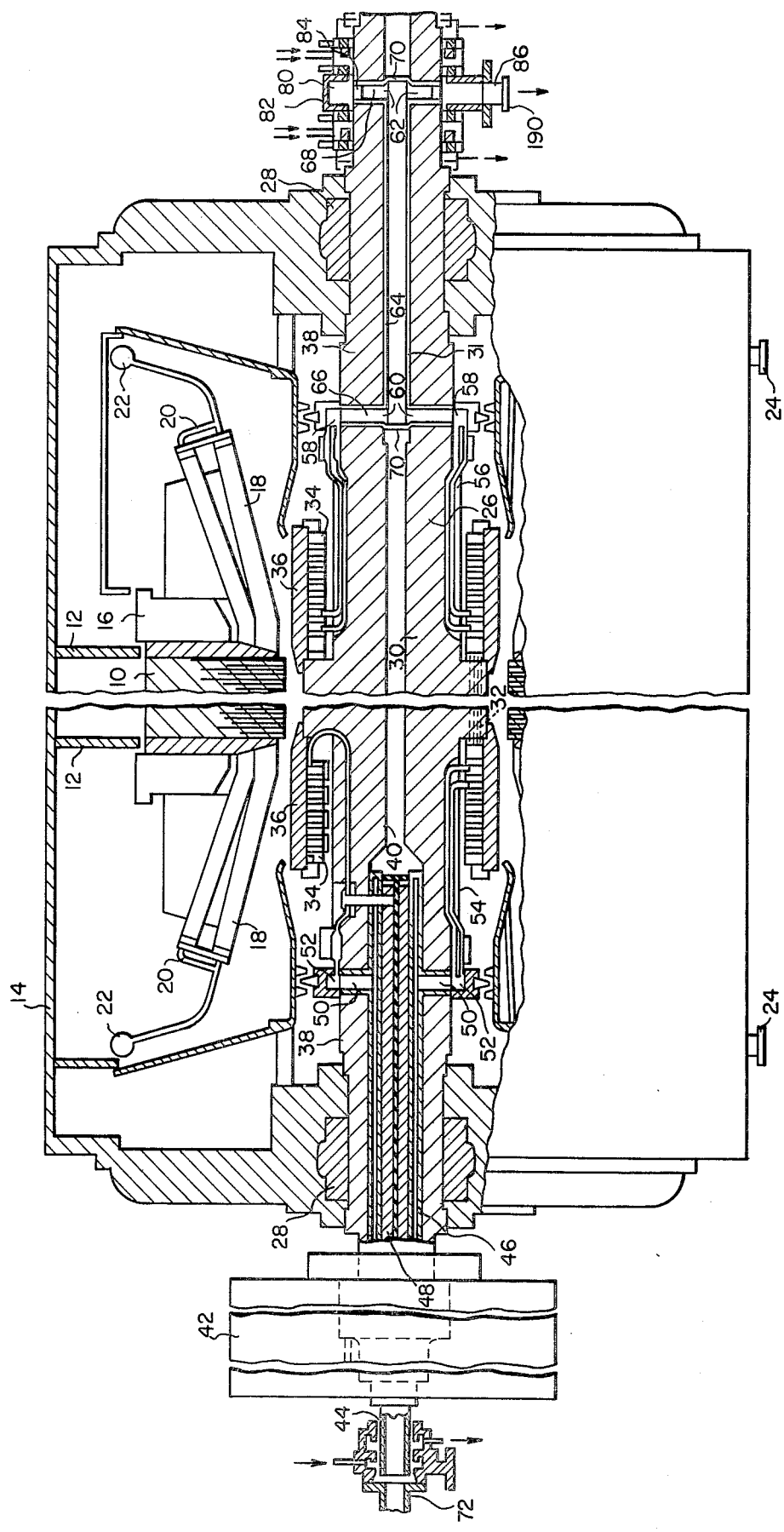
FIG. 1 is an elevational view, in longitudinal section, of a turbine generator having a shaft sealing arrangement for a liquid cooled rotor embodying the teachings of this invention.

Throughout the following description similar reference characters refer to similar elements in all figures of the drawings.

Referring to FIG. 1 of the drawings, the invention is shown embodied in a water cooled rotor of a large turbine generator apparatus, although it will be understood that the sealing means of the present invention is to be utilized in a water cooled dynamoelectric machine of any desired type or size.

As shown, the generator has a stator core 10 supported by the frame rings 12 in a substantially gas-tight outer housing 14. Stator core 10 is of the usual laminated construction having a generally cylindrical bore extending therethrough, the laminations being clamped together between suitable end plates 16. The stator core 10 has longitudinal slots in its inner periphery for the reception of a stator winding 18 which may be of any suitable type, but is shown as a liquid cooled winding. For this purpose circular inlet and discharge manifolds 20 are provided at opposite ends of the apparatus and connected through suitable means, generally indicated at 22, to circulate a coolant such as water through the coils of the stator winding 18. The manifold 20 may be connected as indicated diagrammatically at 24 to an external recirculating system of any desired type. The housing 14 is filled with coolant gas, preferably hydrogen, which is recirculated through the interior of the housing to cool the stator core, and suitable baffling of any desired type may be provided in the housing to direct the flow of gas therein.

The generator has a rotor member 26 which is disposed in the bore of the stator core 10 and supported in bearings 28 at the end of the housing 14. The rotor member 26 has a central body portion 30 which is provided with the usual peripheral slot for the reception of a rotor winding 32. The winding 32, which constitutes the field winding of the generator, may be arranged in any suitable manner in the slots for the rotor to form the desired number of magnetic poles, usually two or four poles in machines of this type. The winding 32 is fabricated of copper conductors which extend longitudinally through the slots of the rotor body 30 and generally circumferentially in the end turn portions 34, which lie beyond the ends of the rotor body 30 and which are supported against rotational forces by retaining rings 36. The conductors of the rotor winding 32 are hollow, having central passages extending through them for flow of coolant liquid from one end of the winding to the other. Any suitable or desired type of flow pattern and any desired type of electrical circuit may be used.

The rotor 26 as shown in the drawings is a liquid cooled rotor of the construction more fully disclosed and claimed in U.S. Pat. No. 3,733,502, issued to L. P. Curtis et al, and assigned to the assignee of the present invention. The rotor 26 has shaft portions 38 extending axially from each end of the body portion 30 and preferably integrally therewith. A central axial bore 40 extends for the entire length of the rotor from one end to the other. An exciter 42 is provided for supplying field excitation to the windings 32. The exciter 42 may be of any desired type and has a shaft connected to the shaft 38 of the rotor 26 to be driven therewith. As more fully described in the last-mentioned Curtis et al patent, the coolant liquid is preferably water and is introduced through the shaft of the exciter 42 into the shaft portion 38 at the left end of the rotor, as seen in FIG. 1. For this purpose, the exciter shaft includes a central tube or pipe 44, preferably a stainless steel or other corrosion resistant material, which is coaxial with the rotor shaft and which extends outwardly from the exciter shaft, as shown in the drawings, for introduction of water.

The water flows from the tube 44 along the axis of the exciter shaft and is directed into an annular passage 46 in the bore 40 of the rotor 26. The passage 46 is preferably formed by two concentric stainless steel tubes which surround the axial electrical leads 48 which provide electrical connections from the exciter 42 to the rotor winding 32. The water flows through the passage 46 to opposed radial passages 50 which extend to an annular distribution chamber 52 on the surface of the rotor shaft 38. Water is conducted from the annular passage 46 by means of hydraulic connectors 54 of any suitable type connected to the individual conductors of the rotor winding (the connection being made to the end turns 34). The water flows through the hollow conductors of the rotor winding 32 and is discharged through similar hydraulic connectors 56 to an annular collection chamber 58 on the shaft 38 at the right hand end of the rotor. The liquid flows from the chamber 58 through opposed radial passages 60 to the bore 40 of the shaft 38, and axially through the bore 40 to the opposed radial passages 62 which extend to the surface of the rotor shaft 38.

All the passages and surfaces exposed to the liquid are preferably lined or covered with stainless steel or other corrosion resistive material to prevent corrosion of the rotor steel by the coolant water. In particular, the bore 40 at the right hand of the rotor 26 is lined with a tubular stainless steel liner 64 extending between the two sets of radial passages 60 and 62 which may themselves be lined with liners 66 and 68, respectively. The ends of the liner 64 are closed by suitable closure partitions 70 to close this section of the bore 40 and to confine the coolant liquid thereto. The coolant water is thus introduced to the rotor 26 through the rotating tube 44 which is on the axis of the exciter shaft 42, and is discharged from the rotor 26 through a radial passage 62. As previously explained, it is necessary to provide very effective seals at both the entrance and discharge point to prevent the escape of the coolant water which flows through the rotor 26 in relatively large volumes and at high velocity and pressure.

At the entrance end, as seen at the left-hand portion of FIG. 1, water is supplied through a stationary pipe and conduit 72. Sealing of the entrance end is provided effectively by a single, radial flow, fluid-film gland seal as disclosed and claimed in U.S. Pat. No. 3,733,501, issued to P. R. Heller et al.

Figure 2:
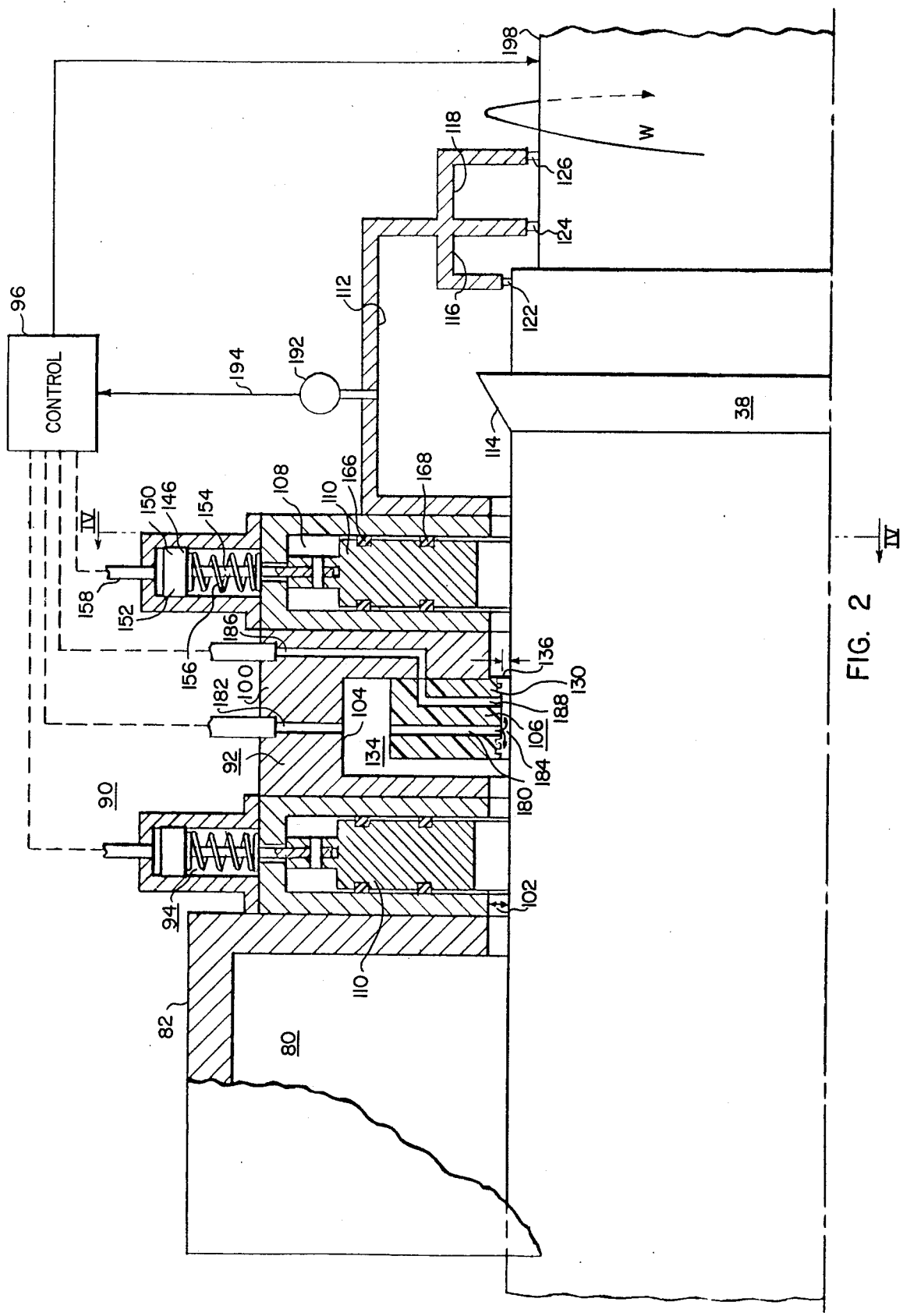
FIG. 2 is an elevational view, entirely in section, of the shaft seal arrangement taught by this invention.

At the discharge end of the rotor, as best shown in FIG. 2, the coolant water which has passed through the rotor is discharged through the opposed radial passage 62 into a stationary discharge chamber 80 disposed in a discharge housing 82 which encircles the shaft 38 at close clearance and which encloses the radial passages 62. As more fully explained in U.S. Pat. No. 3,740,596, issued to L. P. Curtis et al, each of the radial passages 62 preferably has at its outer end a suitable restrictive orifice 84 (FIG. 1) therethrough to control the flow of water discharged from the water cooled rotor 26. The coolant water thus discharged flows into the stationary coolant discharge chamber 80 and is drained therefrom through a suitable drain pipe 86 (FIG. 1). The coolant liquid discharged in this way is preferably cooled and treated and recirculated to the entrance supply pipe, where it is again circulated through the apparatus. The treatment provided for coolant water includes demineralization for electrical insulation purposes and removal of oxygen for corrosion prevention purposes.

It is apparent that the discharge chamber 80 must be sealed to prevent loss of this treated coolant fluid. The earlier mentioned prior art U.S. Pat. No. 3,733,501, issued to P. R. Heller et al, maintained a single, radial flow, fluid-film gland seal device utilizing one sealing liquid prevented escape of the liquid coolant from the completely filled discharge chamber. The most recent prior art, as exemplified by U.S. Pat. No. 3,831,046, disposes a gaseous fluid, such as hydrogen, within a partially filled discharge chamber. This arrangement increases overall efficiency of the generator by limiting fluid friction and avoids cavitation which could lead to pitting and erosion. In order to maintain the liquid coolant within the discharge chamber of this most recent prior art seal, a double flow, fluid-film gland seal is provided. A first sealing liquid completely fills an annular seal chamber and a narrow clearance space between a seal ring and the shaft. This first sealing liquid is specially treated in a manner similar to the liquid coolant and is maintained at a pressure slightly higher than the pressure of a second sealing liquid which is directly introduced through the seal ring into the clearance space. Thus, the first sealing liquid is disposed intermediate between the coolant liquid within the partially filled discharge chamber and the second, untreated, sealing liquid. Due to the slightly higher pressure of the first sealing liquid, only comingling between the liquid coolant and the first sealing liquid, or between the first sealing liquid and the second sealing liquid, is permitted. A series of axially adjacent annular chambers collect any leakage and return it to a suitable drain.

Although the prior art seal last described is effective during the high operational speeds of the rotor, it is not particularly efficient at low rotating speeds or at standstill. Since the coolant discharge chamber 80 must be completely isolated from the atmosphere at all times, a large volume of specially treated first sealing liquid is required in order to maintain the necessary sealing. If such a seal were utilized at low rotational speeds and at standstill, the loss of first sealing liquid would be prohibitive. Conversely, although contact seals are inappropriate for use at high velocities (where the fluid-film seals are most efficient) due to excessive wear at high velocities, such contact seals have been found to be particularly efficient at low rotational speeds and at standstill.

Referring to FIG. 2, this invention discloses a shaft seal arrangement 90 which in combination provides a fluid-film gland seal generally indicated at reference numeral 92 operable during high velocity operation of the rotor 26, and a contact seal generally indicated at reference numeral 94 operable during low rotational speeds and at standstill. The provision of functionally complimentary gland seals 92 and contact seals 94 permits the sealing arrangement 90 to provide an effective seal throughout the entire range of operation of the rotor. A suitable control arrangement generally indicated at reference numeral 96 activates and deactivates the contact seal 94 at predetermined rotational speeds of the rotor 26.

Figure 3:
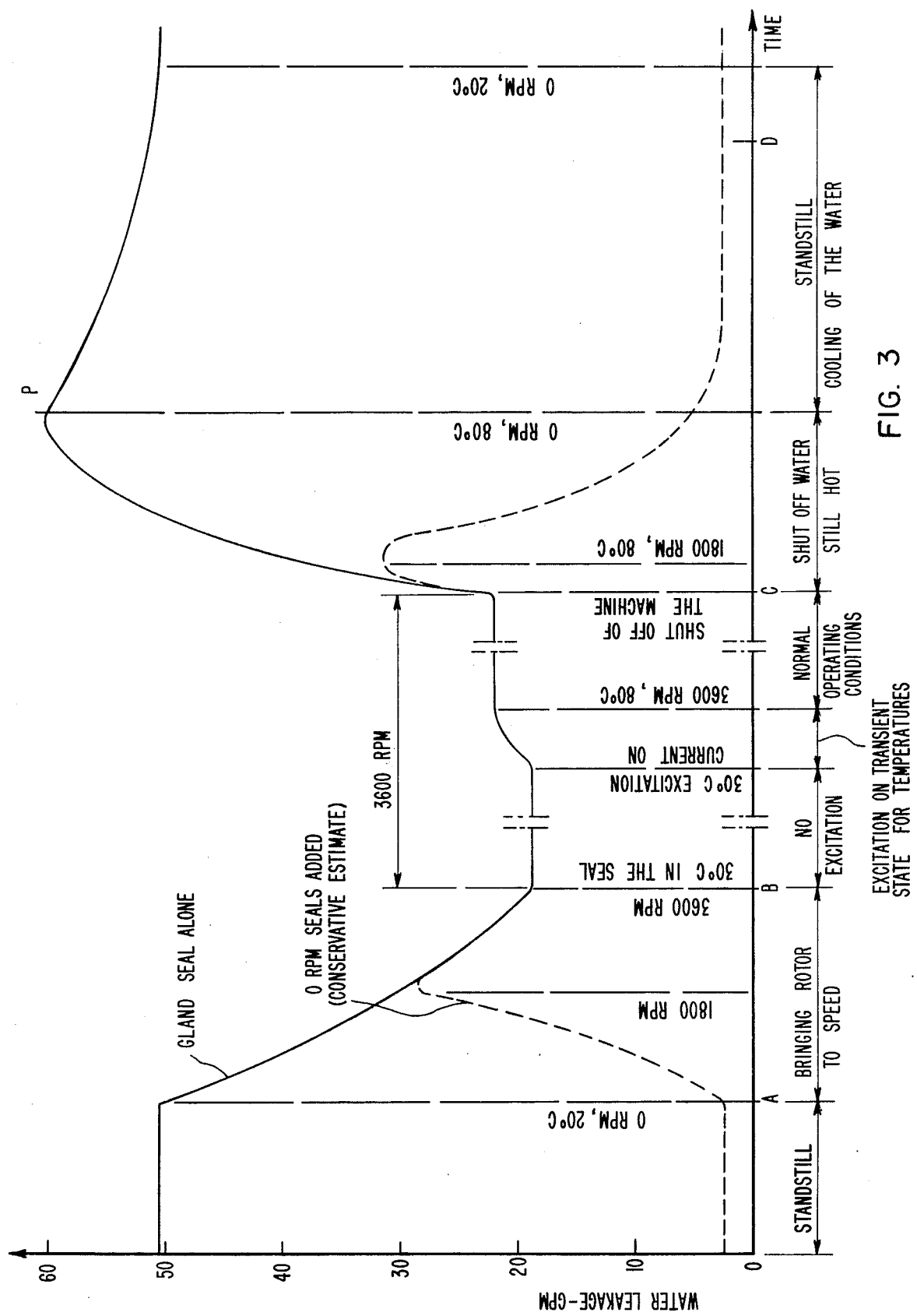
FIG. 3 is a graphical depiction of leakage rates plotted against rotor speed for a prior art seal arrangement and a seal arrangement embodying the teachings of the present invention.

Referring to FIG. 3, a graphical depiction of water leakage rates for prior art fluid-film gland seals as a function of rotor speed is shown and compared to a seal arrangement embodying the teachings of this invention. As seen from FIG. 3, when a fluid-film gland seal is utilized alone, as in the prior art, to provide a discharge chamber shaft seal, leakage flow through the seal through the normal operating speed range of the rotor, indicated between points B to C on FIG. 3, is in the order of 18-23 gallons per minute. However, during standstill or when the rotor is being brought up to operating speed, i.e., from points A to B on FIG. 3, the leakage flow increases 2½ to 3 times. Similarly, when the rotor speed is brought down from operating speed, as shown in FIG. 3 from points C-D, leakage flow is increased. This relationship is indicated by the solid line showing a "valley" during normal operating speed and "peaks" occurring while the rotor is at standstill or is being brought down from normal speed.

However, if a shaft seal arrangement embodying the teachings of this invention is utilized, a sharp reduction in leakage flow, both during startup and especially during standstill, can be observed (as shown by dotted lines on the graphical relationship on FIG. 3). It is thus seen that seal effectiveness can be maintained throughout the entire operating range of the rotor when using a seal arrangement as described herein.

Referring again to FIG. 2, the seal arrangement 90, as stated earlier, generally comprises high speed seal means 92 for effectively sealing the discharge chamber 80 at speeds within a first predetermined range, for example 1800-3600 rpm, low speed seal means 94 for effectively sealing the discharge chamber 80 at speeds within a second predetermined range, for example 0-1800 rpm, and control means 96 for activating and deactivating the low speed seal means 92 when the rotor is operating within one of the predetermined speed ranges. Although a seal arrangement 90 taught by this invention may be disposed on both axial sides of the coolant discharge chamber 80, only the arrangement disposed on one axial side of the discharge chamber 80 is shown.

The seal arrangement 90 is disposed in a seal housing 100 which is disposed axially adjacent to the discharge chamber housing 82. The seal housing is an annular member which surrounds the rotating shaft 38 with a small predetermined clearance 102 and has disposed therein a high speed seal chamber 104. Disposed within the high speed seal chamber 104 is a double flow fluid-film gland seal generally indicated at 106. Disposed on each axial side of the high speed seal chamber 104 is a low speed seal chamber 108. Within each low speed seal chamber is a contact seal member generally indicated by reference numeral 110. It is to be understood that although the high speed seal means 92 is illustrated as comprising the double-flow, fluid-film gland seal 106, any seal device which effectively and efficiently seals the discharge chamber 80 during high rotor operating speeds within a first specified range, for example 1800-3600 rpm, is within the contemplation of this invention. Similarly, although the low speed seal means 94 is illustrated as being the pair of contact seals 110, any seal device which effectively and efficiently seals the discharge chamber 80 during low rotor operating speeds within a second specified range, for example 0-1800 rpm, is within the contemplation of this invention. Further, as will be pointed out specifically herein, only one of the contact seals 110 is necessary to meet the requirements of the seal arrangement taught by this invention.

Axially adjacent to the contact seal chamber 108 is an annular chamber 112. The annular chamber 112 surrounds a thrower 114 which is disposed on the shaft 38. Adjacent the annular chamber 112 is a chamber 116 that is maintained at a pressure greater than atmospheric chamber 118. Labyrinth seals 122, 124 and 126 are disposed as shown between the chambers 112 and 116, 116 and 118, and 118 and the exterior of the seal arrangement housing 90, respectively.

The double flow, fluid-film gland seal 106 disposed in the high speed seal chamber 104 includes a seal ring 130. The seal ring 130 surrounds the shaft 38 with a predetermined small radial clearance 136, which may be in the order of a few mils, and fits snugly into the chamber 104 with the smallest clearance as possible to minimize leakage past the ring 130 in the radial direction. The seal ring 130 is stationary in the chamber 104 and may be held against rotation in any desired manner. An annular chamber 134 is defined between the seal ring 130 and the interior of the chamber 104. As indicated at reference numeral 136, the seal ring 130 extends closer to the surface of the shaft 38 than does the chamber housing 104. This arrangement minimizes possible damage due to inherent and uncontrollable vibrations in the shaft 38. The gland seal ring 130 is free-floating within the chamber 104, allowing the seal ring 130 to move radially with vibration of the shaft 38.

Figure 4:
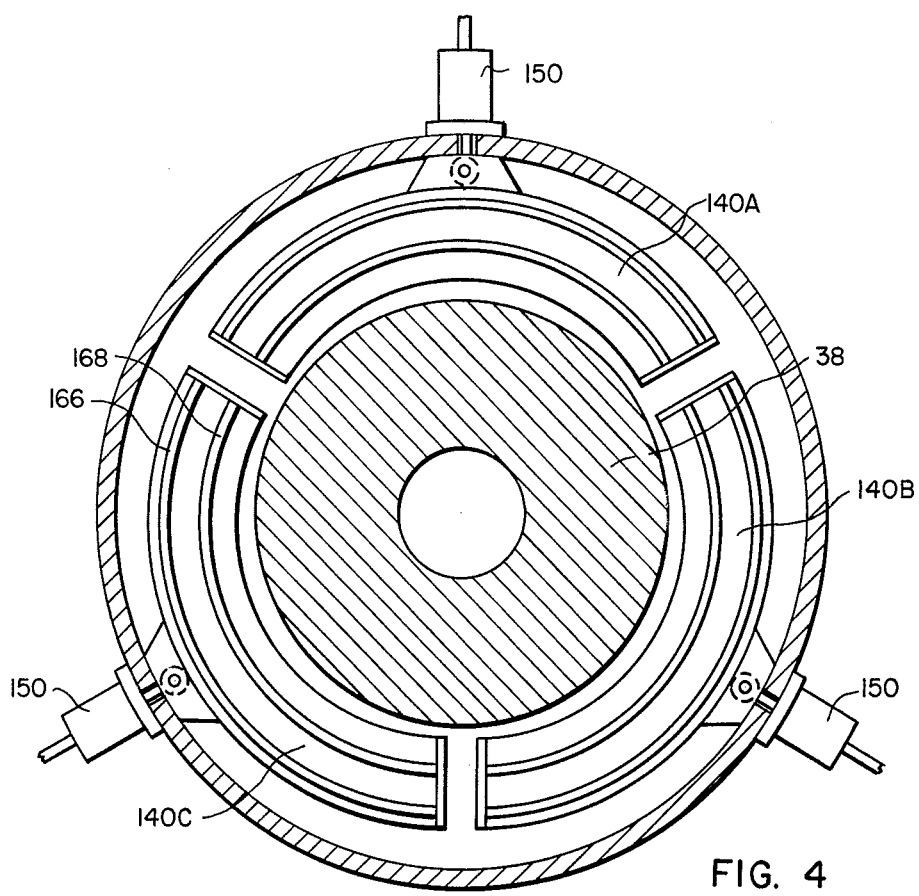
FIG. 4 is a view taken along lines IV—IV in FIG. 2, showing the construction of the contact seal utilized in this invention.

As seen in FIGS. 2 and 4, the contact seals 110 disposed in seal chambers 108 are identical in construction and each comprises an annular ring 140. As best shown in FIG. 4, the seal ring 140 is comprised of circumferentially adjacent arcuate segments 140A, 140B and 140C.

Figure 5:
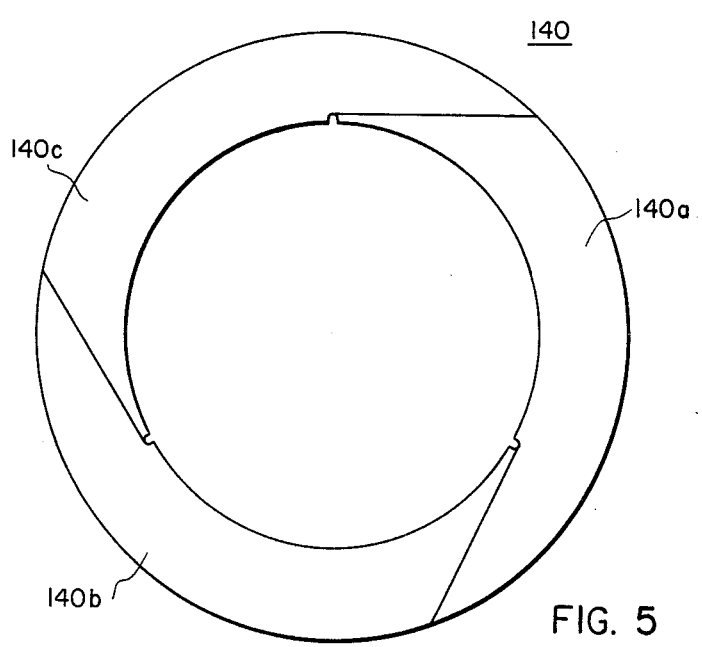
FIG. 5 is a diagrammatic view of an alternative construction for a contact seal utilized by the teachings of this invention.

The segments are all fabricated of relatively soft-nonabrasive material, such as carbon compounds, babbitted bronze, or other copper based alloys. Although three segments are shown, the seal ring 140 may be comprised of any convenient number of segments, the limitation being that there must be a segmentation of the seal rings to permit the seal ring to move radially inward and outward to abrade against and contact the shaft 38 during low rotational speeds and during standstill in response to an appropriate signal from the control means 96. Since they are in segments, the coefficient of thermal expansion of the segments is not of concern. An alternative construction of a seal ring 140 is shown in FIG. 5 and other suitable forms will be apparent.

The contact seals 94 cooperate with the gland seals 92 and provide a complementary function thereto to insure shaft sealing throughout the entire operating speed range of the rotor 26. The material used to fabricate the seals is soft, so that the surface of the rotor shaft 38 will not be damaged while in contact therewith during low operational speeds and at standstill. It is again to be understood that although there are two contact seals shown, the seal arrangement 90 described by this invention will be operable if only the seal 94 between the gland seal 92 and the annular chamber 112 is provided. The other contact seal, although not required, is useful for reasons described herein.

Referring to FIG. 2, first bias means 146, is associated with each segment of the contact seal ring 140. The bias means 146 may be of any suitable construction and be actuated mechanically, hydraulically or electrically. The bias means will be discussed more fully herein. The bias means 146 comprises a piston 150 disposed within a cylinder 152 contiguous to the chamber 108. Fastened to the bottom of piston 150 is a plunger 154 which engages the seal ring 140, as shown in FIG. 2. A bias spring 156 is attached around plunger 154. The chamber above the piston 150 is pressurized, as described herein, by a conduit 158, in response to a signal from the control means 96. Low friction seals 166 and 168 are provided on seal ring 140 (FIG. 2).

The operation of the shaft seal arrangement 90 embodying the teachings of this invention will now be described. It is to be understood that the operation of the seal arrangement and the cooperative association and interaction of its constituent elements — high speed seal, low speed seal, and control means — will be discussed in relation to rotor speed starting from normal at-speed operation, decreasing to standstill and increasing again back to normal, at-speed operation. The direction or rotation is indicated by reference character W.

It will be appreciated that the specially treated liquid coolant that is discharged into the partially filled coolant chamber 80 during the high speed operation of the rotor 26 is at relatively high pressure, and therefore the pressure drop between the coolant discharge chamber 80 and the first atmospheric chamber 112 is high. Thus, leakage of the coolant water from the coolant discharge chamber 80 through the clearance 132 between the seal ring 130 and the shaft 38 into the first atmospheric chamber 112 will be quite large. This is undesirable because the coolant water is treated to maintain a high level of purity and remove dissolved oxygen and recirculate it after discharge from the rotor 26. The loss of a substantial amount of this liquid is therefore disadvantageous as it would require increased capacity of treating and pumping equipment with the attendant costs to supply the necessary large amounts of treated makeup water.

In order to minimize the leakage of the coolant water through the seal ring clearance 132, the seal ring 130 has a plurality of first radial openings 180 extending therethrough. A supply of first sealing liquid is provided through means 182, such as a pipe, into the annular chamber 134 disposed above the seal ring 130 within the chamber 104. The first sealing liquid is a liquid treated in a manner similar to the treatment of the primary coolant liquid. The first sealing liquid is introduced into the chamber 134 within the housing 104 and flows through the first radial openings 180 in the seal ring 130 to the clearance 132 disposed between the seal ring 130 and the shaft 38. The first sealing liquid is maintained at a predetermined pressure and it is thus apparent that a flow of first sealing liquid will be set up and travel in the directions indicated by reference arrows 184 in the clearance space 132. Thus it is seen that the first sealing liquid and the coolant liquid discharged into the partially gas filled primary discharge 80 chamber will intermingle, but this is not vital to the efficiency of the machine, because the first sealing liquid and the primary liquid are of the same nature.

Second means 186, such as a second pipe, introduce a second sealing liquid into the clearance 132 through a second substantially radial passage 188 disposed with the gland seal ring 130. This secondary sealing liquid, typically water, that is less pure than the purity of the first sealing liquid is maintained at a pressure slightly lower (approximately 0.25 psi) than the pressure of the first sealing liquid by suitable pressure regulators.

Since the pressure of the second sealing liquid is slightly less than the pressure of the first sealing liquid any leakage occurring is that of the first sealing liquid into the second sealing liquid. The first sealing liquid therefore prevents contamination of the primary cooling liquid by the second, untreated sealing liquid. Since the pressure of the second sealing liquid is only slightly less than that of the first sealing liquid, the amount of the first sealing liquid which can escape through the clearance 132 is extremely limited and the total leakage of the entire seal is effectively minimized. Such minimization due to the operation of a fluid-film gland seal only occurs when the rotor 26 is operating at its normal operating speed and accounts for the low leakage characteristic of the seal arrangement exhibited in the graphical depiction of FIG. 3, that is, between points B-C thereon.

It is to be understood that although the fluid-film gland seal described herein is of the double flow type, suitable gland seals utilizing the single flow and thus the completely filled discharge chamber may be utilized in conjunction with the contact seals 94, the determination of which gland seal is appropriate being dependent upon economic considerations and capabilities of the water recirculation and deoxygenization systems.

The secondary sealing liquids, plus a small amount of the primary sealing liquid, which has escaped through the seal ring clearance 132 into the first chamber 112 is drained from the first chamber 112 through a drain pipe 190 (FIG. 1). A suitable metering device, such as flow meter 192, monitors the flow of fluid discharged from the chamber 112 and the input of this meter 192 is directed to the control means 96. Leakage out of the chamber 112 is effectively prevented by the pressurized chamber 116 and the labyrinth seal 122 therebetween.

Referring again to FIG. 3, it is seen that during the high speed operation of the rotor, from points B to C on the graph, the leakage flow past the gland seal 92 is relatively low, on the order of 18–20 gallons per minute, thus indicating that the high speed seal is effective. However, as the speed of the rotor slows, if the gland seal were used alone, a sharp increase in leakage flow would occur (culminating in the right-hand "peak" denominated P in FIG. 3). However, a seal utilizing the teachings of this invention will maintain leakage flow to an acceptable low level throughout the entire operating range.

When the rotor slows such that the leakage flow into chamber 112 (as monitored by the gauge 192) begins to increase, the control means 96 initiates operation of the contact seal 94. Of course, another suitable parameter such as a gauge 198, which directly monitors the rotor speed, can be utilized by the control means 96 to initiate the contact seals 94. Whatever the operating parameter chosen, either rotor speed or leakage flow, there may be a sizable tolerance without adverse effect on the generator. A wide activation band would only mean that slightly more flow will occur before the transition from gland to contact sealing occurs. The operation of the control means 96 will be discussed herein.

Once the appropriate parameter, either rotor speed as measured by the gauge 198, or leakage flow measured by the gauge 192, reaches a predetermined threshold, the control means will activate the contact seals 94. During normal operation, the contact seals are in their retracted position, within the chambers 108, i.e., not engaged against the rotor shaft. Upon receipt of the activation signal from the control means 96 the first means 146 which by the bias spring 156 has been operating to hold each of the segments 140 away from the shaft now initiates pressurization of the cylinder 152. The force exerted on the cylinder, against the force of the bias spring 156, exerts a force acting on the contact seal ring 140, through the plunger 154, which causes the seal ring to move radially inward and to contact the shaft 38. The control means 96 also stops fluid flow to the gland seal. During this period, suitable lubrication is provided to prevent damage to the seal ring 130.

The abutment of the contact seal 94 to the shaft during low rotating speeds and at standstill insures that the leakage flow during this period (that is, during speeds from points C to D on the chart) is maintained at an acceptable level (FIG. 3). It is noted that although some abrasion between the contact and the shaft will occur, the shaft will not be damaged due to the relative softness of the material used to fabricate the seal. Also, excessive hydraulic pressure will not be applied due to a safety gauge. It is also noted that a solid contact will be maintained when the contact seal is maintained, since the activation means will insure such contact. Thus, the piston 150 will move downstroke to compensate for wear of the contact seal. Replacement of worn contact seals can be expeditiously performed. FIG. 5, however, indicates an alternate contact seal scheme to compensate for radial wear.

When the machine is again building up to normal speed from standstill, the contact seal is still engaged. As the critical speed parameter, as recorded by gauge 198, or the flow recorded by gauge 192, reaches a predetermined threshold, the control means 96 will cause the first bias means 146 to cease exerting radially inward directed force 210 on the contact seal and cause the spring bias means 156 to exert a radially outward directed force on the contact seal 94, thus permitting the contact between the contact seal and the shaft to disengage. The control means 96 will also reinitiate the flow into the gland seals.

Thus, as the rotor again reaches normal speed, the more efficient gland seal 92 will be reactivated. It is seen that through the control means 96, the most effective seal device — contact seal for low speed and standstill, gland seal for high speed operation — are cooperatively associated to maintain overall leakage of liquid coolant from the discharge chamber at an acceptable level throughout the entire operating speed range of the rotor, thus lowering costs associated with continued treatment of the circulating liquid.

It is noted above that when the flow of sealing water to the gland seal is halted, suitable lubrication for the glands is provided. Dry rubbing between the gland seal ring 130 and the shaft 38, even at the upper speed range of the contact seal, should be prevented to forestall any possibility of damage of the gland seal ring 130.

I claim:

1. A rotor for a dynamoelectric machine comprising:
a body portion having windings thereon, said windings having openings for the circulation of a coolant liquid therethrough,
a shaft extending from said body portion, said shaft having passages for circulation of said liquid coolant therethrough and a discharge chamber disposed thereon, said passages in said shaft including a discharge passage for discharging said liquid coolant from said shaft and into said discharge chamber, and,
a contact seal device
means for applying said contact seal device to said shaft sealing said discharge chamber when said rotor is operating in a first predetermined speed range,
means for removing said contact seal device from said shaft when said rotor is operating in a second predetermined speed range,
a gland seal device for sealing said discharge chamber when said rotor is operating in said second predetermined speed range,
control means for activating said means for applying said contact seal device to said shaft when said rotor is operating in said first predetermined speed range and activating said means for removing said contact seal device from said shaft when said rotor is operating in said second predetermined speed range.

2. The motor of claim 1, wherein
said first speed range is substantially 0–1800 rpm, and said gland seal device is a gland seal and said second speed range is substantially 1800–3600 rpm.

3. The rotor of claim 1, wherein said contact seal device is a segment seal ring having radially overlapping seal members.

4. The rotor of claim 1, wherein said control means comprises a flow meter which monitors leakage flow through said gland seal, said flow meter activating said means for applying said contact seal device when said flow through said gland seal device exceeds a predetermined flow rate, and wherein said flow meter deactivates said means for applying said contact seal device when said flow through said gland seal device decreases below said predetermined flow rate.

5. The rotor of claim 2, wherein said control means comprises a rotor speed meter, said speed meter activating said means for applying said contact seal device when said rotor speed drops below a predetermined value, said speed meter deactivating said means for applying said contact seal device when said rotor speed exceeds a predetermined value.

6. The rotor of claim 1, wherein said means for applying and removing said contact seal device comprises:

a plurality of cylinders each containing a piston, each of said piston being connected to one of said segments of said contact seal device;

a spring means for biasing said piston forcing said segment of said contact seal device from said shaft during said second predetermined speed range, and during said first predetermined speed range;

said control means initiates pressurization of said cylinder forcing said piston to down stroke against said bias of said spring means bring said segments of said contact seal device into contact with said shaft.

7. The rotor according to claim 1, wherein said contact seal device further comprises a plurality of circumferentially adjacent arcuate segments of soft non-abrasive material.

8. The rotor according to claim 7, wherein said plurality of segments is equal to three and said non-abrasive material is babbitted bronze.

* * * * *